May 15, 1962
L. J. STUCKENS
PHOTOCOPY DEVICE
3,034,413
Filed June 11, 1958
3 Sheets-Sheet 2
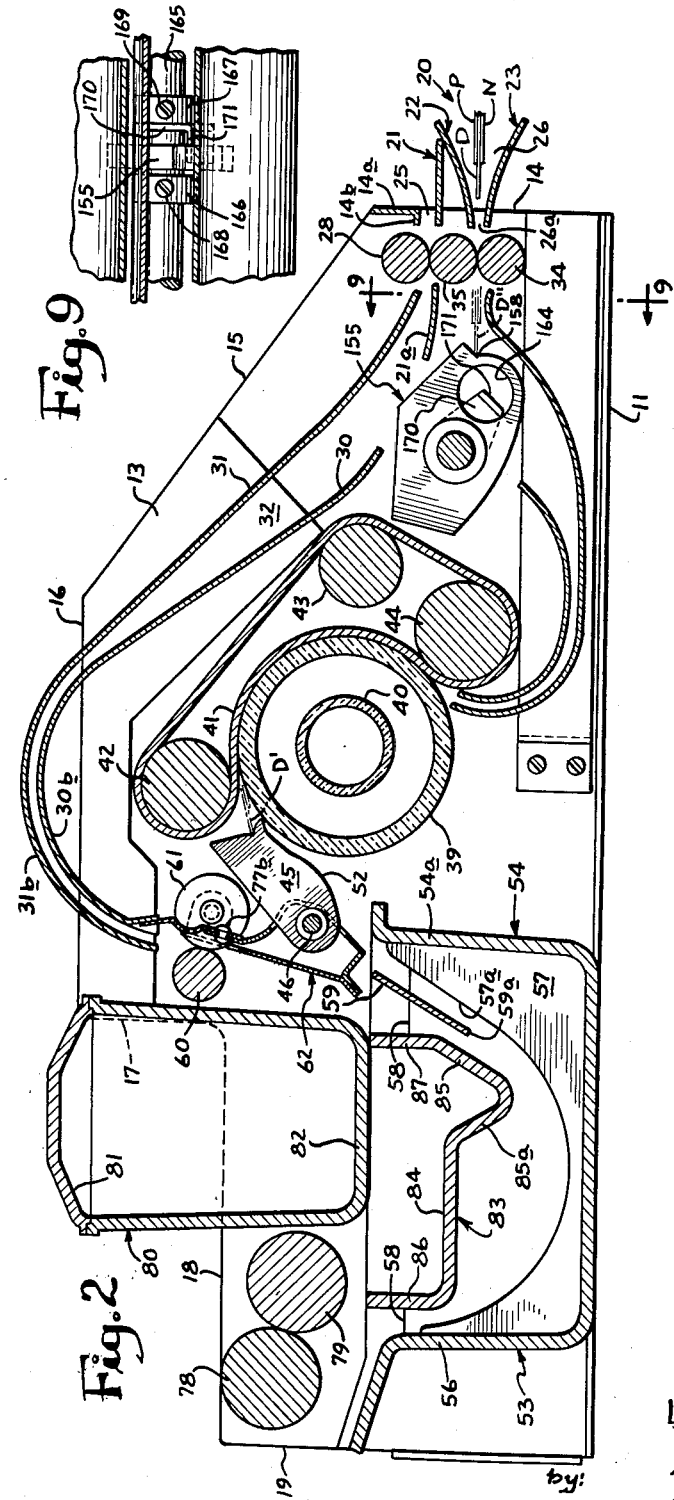
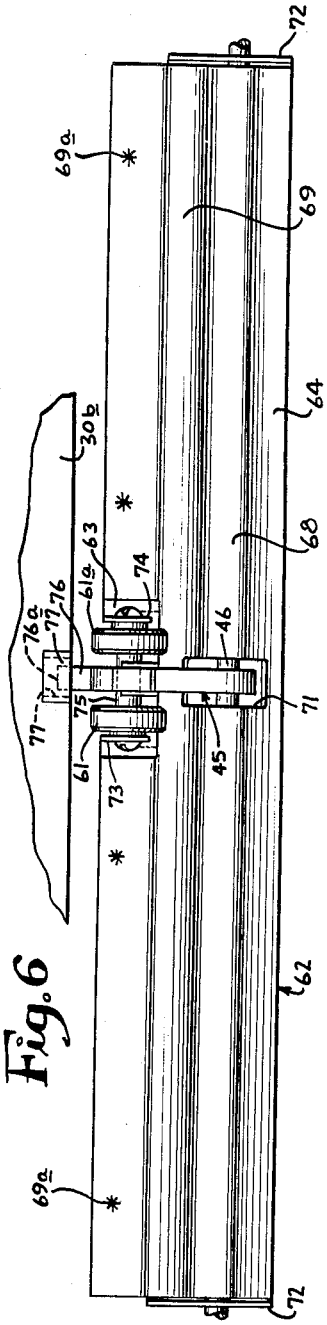
INVENTOR
LEO J. STUCKENS
ATTY.

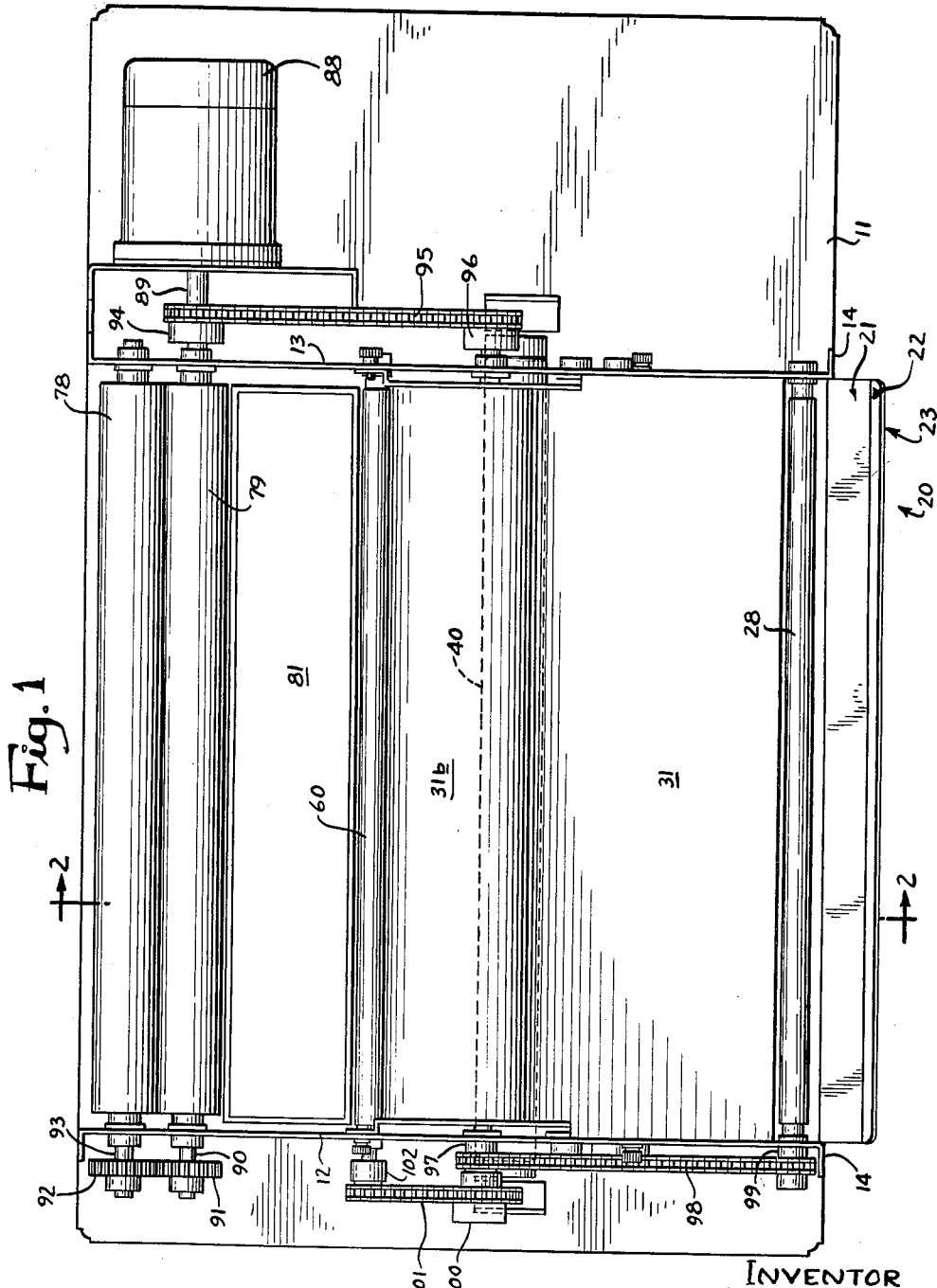

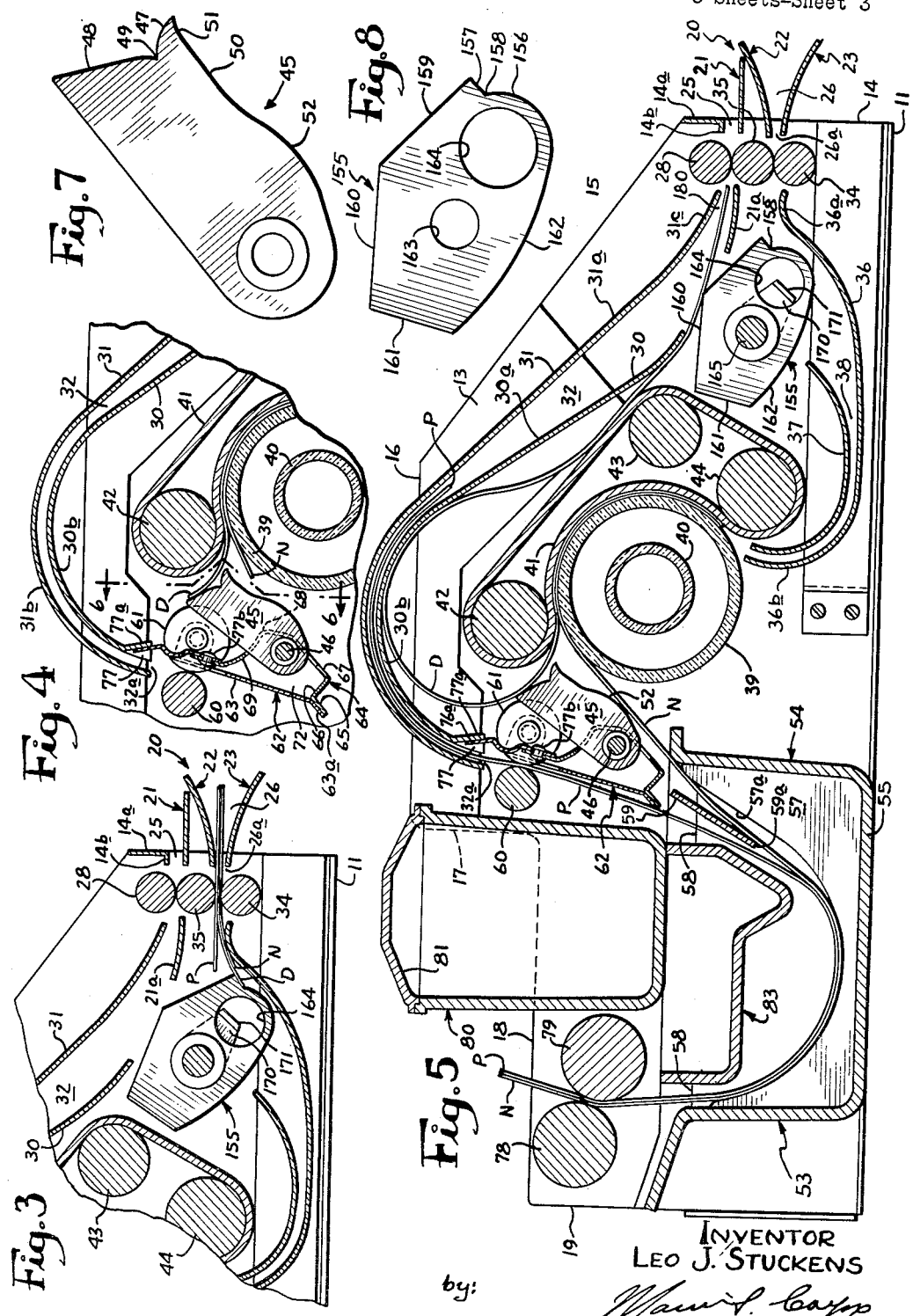

United States Patent Office 3,034,413
Patented May 15, 1962

3,034,413
PHOTOCOPY DEVICE
Leo J. Stuckens, Chicago, Ill., assignor to American Photocopy Equipment Company, Chicago, Ill., a corporation of Illinois
Filed June 11, 1958, Ser. No. 741,372
14 Claims. (Cl. 95—75)

This invention relates to an automatic apparatus for the production of photocopies by means of the so-called "transfer" process.

In the transfer process, the document or other material to be copied is first placed into face-to-face contact with a negative sheet of photosensitive paper, and the two sheets are then exposed to light, usually by the "reflex" method, so as to form a latent photographic image in the negative sheet. The latter is then separated from the document and placed into face-to-face contact with a positive sheet and the two sheets are then immersed in a developing solution and placed together between a pair of rollers. After the image has been transferred from the negative sheet to the positive sheet, the two sheets are then peeled apart and the image-bearing positive sheet becomes the final photocopy product.

As heretofore practiced in the prior art, two independent apparatuses were required for the exposure and development steps respectively. The document and the negative photosensitive sheet were first manually inserted into the exposure apparatus. After the exposure, it was necessary for the operator to take the document and negative sheet from the exposure apparatus, manually separate them, manually place the negative sheet into face-to-face contact with a positive sheet, and then manually insert the two sheets into the developing apparatus.

These manual operations involved in taking the negative sheet from the exposure apparatus and feeding it into the developing apparatus together with a positive sheet are inconvenient, time-consuming and otherwise disadvantageous.

In order to obviate these disadvantages, the novel apparatus in accordance with the present invention is fully automatic once the sheets have been inserted therein, and does not require any manual manipulation by the operator until the entire process is completed and the adhered negative and positive sheets are ready to be pulled apart. That is, the operator merely inserts the negative and positive sheets, together with the document sheet to be copied, into the apparatus whereupon the latter functions automatically to expose the negative sheet, to separate the document sheet from the negative sheet, to return the document sheet to the operator, and to pass the negative and positive sheets through a developer solution and then between a pair of rollers. The adhered positive and negative sheets are then discharged from the apparatus and the operator need merely separate the positive sheet constituting the photocopy.

By thus rendering the process automatic, the technique of making photocopies becomes faster, simpler, more convenient, more economical, and less subject to variations and defects due to manual manipulation. That is, the automatic operation by means of the present apparatus provides a more uniform and more reliable quality standard for the photocopies than can generally be obtained by the ever-varying conditions and inherently non-uniform nature of manual operation.

Another important feature of the present invention resides in a novel device for separating the positive sheet from the other two sheets prior to the exposure step and for separating the document sheet from the negative sheet after the exposure step.

In the sheet handling apparatuses heretofore known in the prior art, separation is usually obtained by a pneumatic or suction device, or by means of a movable deflector element which is moved to alternate positions by a cam mechanism or by electrical solenoids. These prior art sheet separator devices have proven to be complicated, expensive and unreliable in operation.

The novel sheet separator device of the present invention is relatively simple and inexpensive as to its construction, and its mode of operation is extremely reliable in that the device is actuated solely by the thrust of one of the sheets to be separated, thereby eliminating the possibility of any failure or maladjustment of an auxiliary actuating mechanism or pneumatic means as heretofore employed.

This application is a continuation-in-part of my prior co-pending application Serial No. 705,520 filed December 27, 1957.

Referring to the drawings wherein is illustrated a preferred embodiment of the invention:

FIG. 1 is a plan view of a desk-type photocopy apparatus embodying the present invention, with the outer casing eliminated for clarity in illustration;

FIG. 2 is a vertical sectional view taken on line 2—2 of FIG. 1 and shows the document sheet together with the negative and positive sheets in their positions assumed when being inserted into the apparatus;

FIG. 3 is a vertical sectional view of the portion of the apparatus adjacent the entrance opening and shows the positions of the sheets as the positive sheet is being separated from the negative and document sheets by the first kicker or separator device.

FIG. 4 is a vertical sectional view of the portion of the apparatus adjacent the second kicker or separator device which separates the negative sheet from the document sheet after the exposure step;

FIG. 5 is a vertical sectional view similar to FIG. 2 but showing the negative and positive sheets being ejected from the transfer rollers and the document sheet about to be returned to the operator;

FIG. 6 is a sectional view taken on line 6—6 of FIG. 4;

FIG. 7 is an enlarged detail view of the second kicker or separator device which separates the negative sheet from the document sheet after the exposure step;

FIG. 8 is an enlarged detail view of the first kicker or separator device which separates the positive sheet from the negative and document sheets adjacent the entrance opening of the apparatus; and FIG. 9 is a vertical sectional view taken substantially on line 9—9 of FIG. 2 and shows the first kicker and the mounting arrangement therefor.

Referring first to FIGS. 1 and 2, the reference numeral 11 indicates a horizontal planar base member of approximately rectangular configuration. Fixedly secured to base member 11 and extending upwardly therefrom are a pair of spaced parallel walls 12, 13 each having a substantially vertical front edge 14 leading to a rearwardly inclined edge 15 which extends to an upper horizontal edge 16. The latter terminates in a vertical edge 17 which leads downwardly to a rear horizontal edge 18 which in turn extends to a rear vertical edge 19.

At the front of the apparatus (to the right as viewed in FIGS. 2 to 5 inclusive) there is a sheet inlet means indicated generally by the reference numeral 20 and comprising a plurality of guide plates 21, 22, 23 fixedly secured at their lateral edges to walls 12, 13 and extending therebetween. The uppermost guide plate 21 is substantially horizontal and is in horizontal alignment and approximately co-planar with another guide plate 21a spaced rearwardly of plate 21. The middle guide plate 22 is slightly curved and extends downwardly and rearwardly, and the lowermost guide plate 23 is also curved and extends upwardly and rearwardly. Guide plates 22, 23 converge rearwardly with respect to each other so as to define therebetween a tapered inlet opening designated by the reference numeral 26. Secured to the forward vertical edges 14 of walls 12, 13 and extending therebetween is a vertical plate 14a having at its lower edge a horizontal inwardly extending flange 14b spaced above guide plate 21 so as to form therebetween an exit opening 25 for the document sheet to permit the latter to be returned to the operator in a manner to be described below.

Three vertically aligned rollers 28, 34, 35 have their opposite ends rotatably mounted in suitable bearings secured to walls 12, 13. The uppermost roller 28 frictionally engages the intermediate roller 35 which in turn frictionally engages the lowermost roller 34. The line of tangency of rollers 34, 35 is horizontally aligned with the rearward end 26a of inlet opening 26. The line of tangency of rollers 28, 35 is horizontally aligned with the exit opening 25.

The document sheet to be copied is designated by the reference letter D, the negative sheet by the reference letter N, and the positive sheet which eventually becomes the final photocopy product is designated by the reference letter P.

Referring to FIG. 2, the three sheets D, N, P are fed into the apparatus by the operator in the following manner. The operator first places the three sheets together in contacting superimposed relation with the positive sheet P uppermost, the negative sheet N lowermost, and the document sheet D sandwiched therebetween. The photosensitive face of negative sheet N is placed in face-to-face contact with that face of document sheet D which has the matter to be copied. The intermediate document sheet D is placed so that its leading edge extends about ¼ inch beyond the leading edges of negative sheet N and positive sheet. This lead is preferably at least about 3/16 inch to actuate the separator mechanisms, as will be explained below. Positive sheet P has its coated transfer-receiving surface facing downwardly.

The operator then moves the stack of superimposed sheets into the inlet opening 26 defined by guide plates 22, 23 until the leading edges of the stack are engaged between rollers 34 and 35. The latter are drivingly rotated in a manner to be described below so as to cause roller 35 to rotate in a clockwise direction and roller 34 to rotate in a counterclockwise direction as viewed in FIGS. 2, 3 and 5.

The stack of three sheets is then fed rearwardly by rollers 34, 35 toward the first kicker or separator device indicated generally by the reference numeral 155. As best seen in FIG. 8, kicker 155 is provided with a convex forward surface 156 which intersects with an upwardly forwardly inclined surface 157 to define a notch or recess 158 therebetween. A straight surface 159 extends upwardly and rearwardly from surface 157 and terminates at the forward edge of a substantially rectilinear surface 160 which in turn leads to a rear surface 161. The entire bottom surface 162 of kicker 155 has a slight convex curvature and is continuous with the forward surface 156. The intermediate portion of kicker 155 is provided with a circular bearing opening 163. Adjacent the forward end of kicker 155 is a larger circular opening 164 for a purpose to be described.

The mounting arrangement for kicker 155 is best seen in FIG. 9. A horizontal shaft 165 has its opposite ends fixedly secured to walls 12, 13 and its intermediate portion extends through bearing opening 163 so that kicker 155 is freely rotatable about the axis of shaft 165. A pair of collars 166, 167 are fixedly secured to shaft 165 by screws 168, 169 respectively and are located on opposite sides of kicker 155 so as to limit movement of the latter in a direction longitudinally of shaft 165.

An arm 170 is secured to collar 167 and is provided at its lower end with a laterally extending detent 171 which projects into the opening 164 so as to limit the swinging movement of kicker 155. When detent 171 abuts against the lower edge of opening 164 as shown in FIGS. 2 and 5, kicker 155 is at its upper limit of swinging movement, and when detent 171 strikes the upper edge of opening 164 as shown in FIG. 3, kicker 155 will be at the lower limit of its swinging movement. This permissible arc of swinging movement of kicker 155 may be adjustably raised or lowered by adjusting the angular position of collar 167 on shaft 165. That is, screw 169 may be loosened so as to permit angular displacement of collar 167 and arm 170 to the desired position and then fixed in this position by retightening screw 169.

The center of gravity of kicker 155 is located rearwardly of the axis of shaft 165 so that kicker 155 is normally in its uppermost position with detent 171 in engagement with the lower edge of opening 164, as shown in FIGS. 2 and 5. As rollers 34, 35 feed the stack of sheets rearwardly, the leading edge of document sheet D will eventually strike the forward end of kicker 155. If said leading edge strikes the inclined surface 157 the latter will guide the leading edge downwardly into recess 158, as shown by the dash-dot lines at D". Similarly, if the leading edge strikes the convex surface 156 below recess 158, said surface 156 will guide the leading edge of document sheet D upwardly into recess 158. Continued rearward movement of the three sheets causes the leading edge of document sheet D to exert a thrust against kicker 155. The line of action of this thrust is below the axis of shaft 165 thereby causing kicker 155 to pivot in a clockwise direction from its uppermost position shown in FIGS. 2 and 5 to its lowermost position shown in FIG. 3. As kicker 155 pivots downwardly, surface 157 engages the upper surface of sheet D to cause its leading edge to be lowered outwardly of recess 158 and then downwardly along surface 156. The leading edge of document sheet D, together with the lowermost negative sheet N, will then be guided by the convex surface 156 in a downward direction. However, the leading edge of the uppermost positive sheet P will strike the inclined surface 159 at an acute angle and will slide upwardly therealong so as to be guided in an upward direction, thereby separating positive sheet P from the other two sheets D, N as the sheets travel in their respective paths around kicker 155. The latter remains in its lowermost position shown in FIG. 3 until the trailing edges of sheets D, N pass out of contact with surface 156, whereupon kicker 155 will then be free to pivot back to its initial rest position shown in FIGS. 2 and 5.

As the sheets travel rearwardly from rollers 34, 35 toward kicker 155 they are supported by the arcuate forward end 36a of a guide plate 36 which has its rearward end curved upwardly at 36b. Another curved guide 37 is located above guide plate 36 and cooperates therewith to provide a guideway 38 therebetween. As the document sheet D and negative sheet N pass downwardly below kicker 155 they travel along the upper surface of guide plate 36 and through the guideway 38 to a well-known exposure means described hereinbelow.

Secured to the side walls 12, 13 and extending substantially entirely across the space therebetween are a pair of guide plates 30, 31 having upwardly rearwardly inclined portions 30a, 31a formed integral with parallel arcuate portions 30b, 31b. The guide plates 30, 31 cooperate to form a guideway 32 therebetween. The latter guides positive sheet P from kicker 155 rearwardly and upwardly and then downwardly out through the exit end 32a of guideway 32.

The exposure means comprises a hollow plastic or glass cylinder 39 which is preferably transparent or at least translucent. Cylinder 39 extends horizontally and longitudinally between side walls 12, 13 and is mounted for free rotational movement about its axis by any suitable mounting means (not shown) well-known to those in the art. Extending axially through cylinder 39 is a fluorescent tube or other light source 40. A conventional flexible rubber or plastic belt 41 extends around a segment of the exterior surface of cylinder 39 and in contact therewith. Belt 41 is continuous and extends around three rollers designated 42, 43, 44 respectively, and is kept under tension.

It will be seen that as the rollers 42, 43, 44 are drivingly rotated by an arrangement to be described below, the belt 41 travels in contact with cylinder 39 in a counterclockwise direction about the axis of the latter as viewed in FIG. 2. This movement of the belt 41 will also cause corresponding rotation of cylinder 39 frictionally engaged therewith. Guideway 38 will direct negative sheet N and document sheet D from rollers 34, 35 to the initial point of tangency of cylinder 39 and belt 41 whereupon these two sheets will be gripped between cylinder 39 and belt 41 and carried therebetween in a counterclockwise direction about the axis of cylinder 39 throughout the path of contact of the belt 41 therewith. During this interval, the light rays from the light source 40 will radiate outwardly so as to be transmitted through the transparent or translucent cylindrical wall of cylinder 39. The light rays will then pass through negative sheet N and strike the image-bearing front face of document sheet D, from which the light rays will be reflected back to the photosensitive layer coated on the front face of negative sheet N and thereby produce a latent photographic image in negative sheet N by the so-called "reflex" method.

After this exposure step, negative sheet N and document sheet D travel to the second separator device now to be described. Referring first to FIGS. 2 and 6, the reference numeral 45 designates generally the second separator or kicker member mounted for free rotational movement on a horizontal shaft 46. As best seen in FIG. 7, the outer end of kicker 45 comprises a surface 47 which is preferably but not necessarily slightly arcuate and which intersects with another surface 48 angularly inclined with respect thereto to form a recess or notch 49. The outer end of edge 47 intersects with a lower edge 50 to form a lip 51. The lower edge 50 extends downwardly and rearwardly to a convex edge 52.

Referring again to FIG. 2, it will be seen that the center of gravity of kicker 45 is located forwardly of shaft 46 so that kicker 45 will be normally urged by the force of gravity in a clockwise direction and will normally be so positioned that the lip 51 rests upon the exterior surface of cylinder 39. As document sheet D and negative sheet N travel outwardly and rearwardly from between belt 41 and cylinder 39, the leading edge of document sheet D will engage and enter the recess 49 as shown by the dash-dot lines in FIG. 2 wherein the document sheet in this initial engaging position in indicated by the reference letter D¹.

It will be understood that if the leading edge of the document sheet droops slightly so as to first make contact with the edge 47, or is slightly elevated so as to first strike the edge 48, these edges will guide the leading edge of the document sheet toward and into the recess 49. Due to the fact that the sheets were initially inserted into the apparatus with the leading edge of document sheet D projecting about ¼ inch forwardly of the leading edge of negative sheet N, the latter does not make contact with kicker element 45 until after the following operation has occurred.

That is, continued movement of document sheet D will cause its leading edge to exert a thrust upon the separator or kicker 45. The line of this thrust extends rearwardly and above shaft 46 so as to exert a torque upon kicker 45 to rotate the latter upwardly in a counterclockwise direction about shaft 46.

As kicker 45 rotates upwardly in response to the thrust exerted by document sheet D, the arcuate contour of edge 47 engages the lower surface of document sheet D to cause its leading edge to be raised outwardly of recess 49 and upwardly along the edge 48, as best shown in FIG. 4. Kicker 45 will have been rotated to its upward position before the leading edge of negative sheet N advances sufficiently to contact kicker 45. The leading edge of negative sheet N then contacts kicker 45 along the edge 50 thereof and slides downwardly along edge 50 and then along the convex edge 52. It will thus be seen that document sheet D and negative sheet N are thereby separated by kicker 45 which directs the sheets in different directions. The edge 48 of kicker 45 remains in contact with document sheet D so as to hold kicker 45 in its uppermost position while negative sheet N is passing beneath kicker 45 in contact with the convex edge 52 thereof, as best seen in FIG. 5. After the trailing edge of document sheet D has passed the outer extremity of edge 48, kicker 45 will be free to rotate in a clockwise direction down to its original normal position with its lip 51 resting upon cylinder 39.

After leaving the second separator or kicker 45, the leading edge of document sheet D travels upwardly and strikes the lower surface of the curved portion 30b of guide plate 30, which then guides document sheet D around forwardly and downwardly along the upper surface of kicker 155 and then through the guideway 180 defined by guide plate 21a and the lower end 31c of guide plate 31. The leading edge of document sheet D is then engaged between rollers 28, 35 which feed document sheet D forwardly through exit opening 25 and out of the apparatus so as to be returned to the operator. After negative sheet N leaves kicker member 45 it passes through a developing tank 53 simultaneously with positive sheet P, as described below.

Developing tank 53 comprises a container 54 having a bottom 55 and upstanding walls. The upper end of container 54 is open except for the closure provided by an arrangement described below. Mounted in container 54 are a plurality of conventional guide plates 57 which extend in vertical parallel planes and are horizontally spaced from each other.

Container 54 is adapted to contain a developer solution of the conventional transfer process type, the normal level of the solution being indicated at 58. The upper edges 57a of guide plates 57 extend from the region adjacent the forward edge of container 54 downwardly into the developer solution below the level 58 and then upwardly at the rear end of container 54.

Also mounted within container 54 is a plate 59 which extends downwardly toward the developer solution so as to have its lower end 59a located below the developer solution level 58. The plate 59 is inclined downwardly and rearwardly.

While document sheet D and negative sheet N are being subjected to the operation of the exposure means 39, 40 and the kicker 45, the positive sheet P travels upwardly through guideway 32 and then arcuately around the upper portion of the latter and then downwardly through the exit end 32a thereof. Positive sheet P then passes between a drive roller 60 and idler rollers 61, 61a rotatably mounted on a swinging support structure indicated generally by the reference numeral 62.

As shown in FIG. 6 in conjunction with the other figures, support 62 comprises a rear planar member 63 secured to a front bulging member 64. Both members 63, 64 are preferably stamped of sheet metal. Rear member 63 is provided along its lower edge with a bent integral lip portion 63a, and front member 64 is provided with a lower marginal edge portion 65 secured by welding to said lip portion 63a. Extending integrally from the portion 65 is a downwardly forwardly inclined portion 66 leading to an upwardly forwardly inclined portion 67 which in turn leads to an outwardly curved portion 68 leading to a concave upper portion 69. The latter is in turn integral with a planar upper marginal portion secured by spot welding 69a to rear member 63.

The front support member 64 is provided with a rectangular opening 71 through which kicker 45 projects forwardly from within the hollow space between support members 63, 64. It will be seen that shaft 46 extends longitudinally through this hollow space. Rear support member 63 is provided at each of its opposite lateral edges with an integral flange 72 extending in a vertical plane and having a forward edge contoured to coincide with the shape of the front support member 64.

Opposite end portions of shaft 46 project through suitable bearing apertures provided in flanges 72 whereby the entire support structure 62 is mounted for free swinging movement on shaft 46. The opposite ends of the latter may be fixedly secured to walls 12, 13. If desired, the relatively long integral shaft 46 may be segmented to form three separately mounted coaxially aligned short shafts upon which may be rotatably mounted kicker 45 and the two opposite ends of structure 62 respectively.

The intermediate portion of rear support member 63 is provided with a pair of forwardly projecting integral flanges 73, 74 horizontally spaced from each other and extending in vertical planes adjacent the upper edge of member 63. A horizontal shaft 75 has its opposite ends secured within apertures provided in flanges 73, 74.

The pair of rollers 61, 61a are rotatably mounted on shaft 75 and are separated from flanges 73, 74 and from each other by conventional spacer sleeves. It will thus be seen that the entire support structure 62 may swing counterclockwise (as viewed in FIG. 2) about the axis of shaft 46 so as to enable rollers 61, 61a to be maintained in contacting engagement with roller 60.

In order to urge the support structure 62 in said counterclockwise direction, front support member 64 has secured to its upper edge an upstanding leaf spring 76. The latter has its lower end fixed to front support member 64 by a rivet 77b and its upper end 76a is engaged within a recess or pocket 77 formed in the rear end of the curved portion 30b of guide plate 30. The wall 77a of recess 77 urges the upper end 76a of leaf spring 76 rearwardly so as to bias the entire support structure 62 in a counterclockwise direction about shaft 46 to maintain rollers 61, 61a in engagement with roller 60.

As negative sheet N passes below kicker 45, the convex edge 52 of the latter urges sheet N downwardly to maintain its leading edge out of contact with front support member 64 until sheet N is at such an angle that its leading edge will strike front support member 64 at an acute angle to the inclined portion 67 thereof, whereby the leading edge of sheet N will then be guided by portion 67 downwardly into the space between guide plates 57 and plate 59. Simultaneously with this downward movement of negative sheet N into the developing tank 53, positive sheet P passes downwardly from the outer exit end 32a of guideway 32, and then down between rollers 60, 61, 61a, and is then guided by the lip portion 63a of rear support member 63 so as to enter developing tank 53 substantially simultaneously with negative sheet N. As best seen in FIG. 5, lip portion 63a maintains positive sheet P spaced rearwardly from plate 59 and out of contact therewith, thereby providing more thorough moistening of the front surface of positive sheet P and eliminating friction which would impede the movement of sheet P if allowed to contact plate 59. Plate 59 is unnecessary and may be eliminated if the liquid level 58 is always maintained at the normal height and if sheets N, P are of normal weight and stiffness. After the sheets N, P pass below the lower end 59a of plate 59 they come together and pass together through the developing solution in tank 53 along the upper arcuate edges 57a of guide plates 57 and then upwardly at the rearward end of developer tank 53 to a pair of rollers 78, 79. As the sheets N and P pass between rollers 78, 79, the latter press the sheets together to wring excess solution therefrom and the sheets remain adhered to each other until manually separated by the operator after completion of the transfer of the photographic image from negative sheet N to positive sheet P. As the sheets leave rollers 78, 79, they are ejected through a suitable opening in the casing (not shown) of the apapratus and are grasped by the operator who waits a predetermined length of time, usually less than a minute, and then peels the two sheets apart. The negative sheet N may then be discarded and the operator is thus provided with the final photocopy product in the form of positive sheet P.

The reference numeral 80 indicates generally a supply container for the developer solution and is sealed at its upper open end with a cover 81. The bottom 82 of container 80 is located adjacent the upper edge of developer tank 53 and immediately above a trough indicated generally by the reference numeral 83. The latter has a rearwardly and upwardly inclined bottom wall portion 85a converging with respect to an upwardly forwardly inclined bottom wall portion 85, and a horizontal bottom wall portion 84. The rear end of trough 83 has a vertical end wall 86 spaced forwardly of the rear wall 56 of developer tank 53. Trough 83 also has a vertical front wall 87 spaced rearwardly of the separator plate 59.

Trough 83 extends transversely almost entirely across developer tank 53 from one side wall thereof to the other. It will thus be seen that the exposed surface of the developer solution is relatively small, comprising practically only the area between the trough rear wall 86 and container rear wall 56 and the area between trough front wall 87 and container front wall 54a. That is, trough 83 limits the exposed solution surfaces to relatively small areas at the inlet and outlet ends of developer tank 53. By thus limiting the exposed surface of the solution to two relatively small areas, the tendency of the developer solution to oxidize by contact with the atmosphere or to otherwise become contaminated, or to evaporate, is considerably reduced, and a large volume of developer solution may be maintained or stored within developer tank 53 for much longer periods before deterioration than was possible with the arrangements heretofore employed in the prior art.

In order to maintain the exposed surface areas of the developer solution relatively small, the solution level 58 must be maintained at a sufficient height with respect to trough 83. For this purpose, any suitable or conventional valve structure (not shown) may be employed to feed automatically the developer solution stored within supply container 80 into developer tank 53 in response to lowering of liquid level 58 so as to maintain the latter at the desired height.

It will thus be seen that positive sheet P travels from inlet opening 26 to rollers 78, 79 through a first path comprising guideway 32 and then between rollers 60 and 61, 61a through developer tank 53. During this movement of positive sheet P through this path, negative sheet N travels from inlet opening 26 to rollers 78, 79 through a second path including guideway 38, and then around cylinder 39, below kicker 45 and then through developer tank 53. In order to provide that negative sheet N and positive sheet P will emerge from rollers 78, 79 in adhered face-to-face relation with the leading edges of both sheets in approximate alignment, the length of the first path of positive sheet P is made substantially equal to the length of the second path of negative sheet N.

In order to drivingly rotate the several rollers which impel the three sheets through their respective paths in the apparatus, there is provided an electric motor 88 mounted on the rear right-hand portion of the support base 11. All of the rollers, except rollers 61, 61a, have their opposite ends rotatably mounted in conventional bearings in side walls 12, 13. Motor 88 has a shaft 89 drivingly connected to roller 79 at the right-hand end thereof (FIG. 1). The left-hand end of roller 79 is provided with an outwardly extending shaft 90 having fixedly secured thereto a gear 91 in engagement with a gear 92 fixedly secured to a shaft 93 secured to the left-hand end of roller 78. It will thus be seen that motor shaft 89 drivingly rotates roller 79 which in turn drives roller 78 in the opposite direction through the gears 91, 92.

Fixedly secured to motor shaft 89 is a toothed sprocket 94 having teeth engaged with the rear end of a drive chain 95 the forward end of which is engaged around a toothed sprocket 96 fixedly secured to a shaft integral with the right-hand end of roller 42. The left-hand end of the latter is provided with a shaft projecting outwardly through a suitable aperture in the left-hand side wall 12 and a toothed sprocket 97 is secured to this shaft. A drive chain 98 has its rearward end in engagement with sprocket 97 and its forward end is drivingly engaged with a sprocket 99 fixedly secured to the left-hand end of roller 35. It will thus be seen that motor 88 drives roller 42 through drive chain 95 so as to cause movement of belt 41 and thereby to rotate cylinder 39 in a counterclockwise direction as viewed in FIG. 2. The drive torque of motor 88 is also transmitted to roller 35 through chain 98, and thereby drivingly rotates rollers 28 and 34 which are in frictional engagement with roller 35.

The left-hand end of roller 42 also has fixedly secured thereto a drive sprocket 100 engaged by a drive chain 101 which is also in engagement with a drive sprocket 102 fixedly secured to the left-hand end of roller 60, thereby transmitting a drive torque to the latter which in turn causes rotation of rollers 61, 61a in frictional engagement therewith.

Due to the lead of document sheet D, that is, the amount by which the leading edge of document sheet D projects forwardly beyond the leading edges of the other two sheets N, P when the sheets are initially inserted into the apparatus, the narrow marginal area of document sheet D adjacent its leading edge will not be reproduced in the final photocopy. In almost all instances, this will be of no importance since very few documents have reproducible matter extending out to the very edge of the sheet on all sides and it is usually possible to orient the document so that this leading marginal area is blank. However, in those few instances where it is desired to reproduce the entire area of document sheet D, this may be accomplished in the present apparatus in the following manner.

A narrow strip of paper may be provided with a band of adhesive along one edge. This strip may be adhesively secured to the back of document sheet D with the non-adhesive edge projecting forwardly beyond the leading edge of document sheet D by an amount corresponding to the desired lead. This projecting portion of the adhered strip then becomes, in effect, a blank marginal extension of the document for actuation of kickers 45, 155 and the original actual forward edge of document sheet D may be placed coincident with the forward edges of the other two sheets so as to reproduce the entire area of the document.

It will be understood that instead of the presently disclosed arrangement of the first kicker 155 separating positive sheet P from the other two sheets D, N, this initial separation may be effected by the arrangement of guide plates disclosed in said prior co-pending application Serial No. 705,520.

It is to be understood that the specific embodiment of the invention shown in the drawings and described in detail above is merely illustrative of one of the many forms which the invention may take in practice, and numerous changes and modifications thereof will readily occur to those skilled in the art without departing from the scope of the invention delineated in the appended claims which are to be construed as broadly as possible in view of the prior art.

I claim:

1. An apparatus for automatically producing photocopies, said apparatus comprising means for receiving negative, positive and document sheets in stacked superimposed relation, means responsive to the thrust of at least one of said sheets for separating said positive sheet from the other two sheets, means for conveying said negative and document sheets in superimposed contacting relation, means for exposing said sheets to produce a latent photographic image in said negative sheet, means for separating said negative and document sheets, means for discharging said document sheet from the apparatus, means for simultaneously conveying said positive sheet and said exposed negative sheet through a developer solution, means for conveying said positive sheet after being separated from said other two sheets along a path equal in length to that of said negative sheet whereby said negative and positive sheets enter said developer solution very close to the same time and emerge therefrom in substantial alignment, and means for pressing said negative and positive sheets into face-to-face contact to transfer said image from said negative sheet to said positive sheet.

2. An apparatus as recited in claim 1 wherein each of said separating means comprises a kicker member, means mounting said kicker member for movement to either one of two alternative positions, means on said kicker member responsive to engagement by one of said sheets to move said kicker member from a first of said positions to the second position thereof, a first cam means on said kicker member for guiding said one sheet in a first direction, and a second cam means on said kicker member responsive to movement of the latter to its second position to guide a second sheet in a second direction different from said first direction so as to separate said two sheets.

3. An apparatus for automatically producing photocopies, said apparatus comprising sheet inlet means for receiving a document sheet together with a negative sheet and a positive sheet while said sheets are in a superimposed contacting relation, means responsive to the thrust of at least one of said sheets for separating said positive sheet from said other two sheets, means for conveying said negative sheet and said document sheet in superimposed contacting relation, means for exposing said document sheet and said negative sheet to produce a latent photographic image in said negative sheet, means for separating said negative sheet and said document sheet from each other, means for discharging said document sheet from the apparatus, means for simultaneously conveying said positive sheet and said exposed negative sheet through a developer solution means for conveying said positive sheet after being separated from said other two sheets along a path equal in length to that of said negative sheet whereby said negative and positive sheets enter said developer solution very close to the same time and emerge therefrom in substantial alignment, and means for pressing said negative and positive sheets into face-to-face contact to transfer said image from said negative sheet to said positive sheet.

4. An apparatus as recited in claim 3 wherein said means for separating said negative and document sheets comprises a kicker member, means rotatably mounting said kicker member for oscillatory movement between two alternative angular positions, said kicker member having recess means for engageably receiving the leading edge of a first of said sheets during advancing movement of the latter while the kicker member is in a first of said positions to cause the kicker member to pivot from said first position to said second position thereof in response to the thrust of said first sheet, a first guide means on said kicker member for guiding said first sheet in a first direction, and a second guide means on said kicker member responsive to movement of said kicker member to said second position to guide the second sheet in a second direction so as to separate said sheets from each other.

5. An apparatus for automatically producing photocopies, said apparatus comprising an exposure means, a developing tank, sheet opening means for receiving a stack of three sheets in superimposed contacting relation, said sheets consisting of an original document sheet to be copied, a positive sheet and a negative sheet, said sheet opening means having an inlet opening and an outlet opening, means responsive to the thrust of at least one of said sheets for separating said positive sheet from said other two sheets, means for guiding said sheets through said inlet opening, guide means forming a first sheet travel path extending from said inlet opening to said developing tank, additional guide means forming a second sheet travel path extending from said inlet opening past said exposure means and then to said developing tank, means for impelling said positive sheet along said first path, means for impelling said document sheet and negative sheet along said second path, sheet separator means located adjacent said second path between said exposure means and said developing tank for separating said document sheet from said negative sheet, other guide means forming a third sheet travel path extending from said sheet separator means to said outlet opening, means for impelling said document sheet along said third path and outwardly of the apparatus through said outlet opening, a pair of pressure rollers located adjacent said developing tank, said first path and said second path extending through said developing tank and then to said pressure rollers, the respective lengths of said first and second paths between said inlet opening and said pressure rollers being approximately equal whereby the leading edges of said positive and negative sheets will be in approximate alignment upon emergence from said pressure rollers.

6. An apparatus as recited in claim 5 wherein said means for separating said negative and document sheets comprises a kicker member, means rotatably mounting said kicker member for oscillatory movement between two alternate angular positions, said kicker member having recess means for engageably receiving the leading edge of a first of said sheets during advancing movement of the latter while the kicker member is in a first of said positions to cause the kicker member to pivot from said first position to said second position thereof in response to the thrust of said first sheet, a first guide means on said kicker member for guiding said first sheet in a first direction, and a second guide means on said kicker member responsive to movement of said kicker member to said second position to guide the second sheet in a second direction so as to separate said sheets from each other.

7. An apparatus for automatically producing photocopies, said apparatus comprising inlet opening means for receiving negative, positive and document sheets in stacked superimposed relation, means responsive to the thrust of one of said sheets for separating said positive sheet from the other two sheets, means for maintaining said negative sheet and said document sheet in superimposed contacting relation, means for exposing said superimposed sheets to produce a latent photographic image in said negative sheet, automatic means for separating said sheets after said exposure, means for automatically discharging said separated document sheet from the apparatus, automatic means for simultaneously conveying said exposed negative sheet and said positive sheet through a developer solution, means for conveying said positive sheet after being separated from said other two sheets along a path equal in length to that of said negative sheet whereby said negative and positive sheets enter said developer solution very close to the same time and emerge therefrom in substantial alignment, and automatic means for pressing said developed negative sheet into face-to-face contact with said positive sheet to transfer said image from said negative sheet to said positive sheet.

8. An apparatus as recited in claim 7 wherein said means for separating said negative sheet and said document sheet comprises a kicker member, means mounting said kicker member for movement to either one of two alternate positions, means on said kicker member responsive to engagement by one of said sheets to move said kicker member from a first of said positions to the second position thereof, a first cam means on said kicker member for guiding said one sheet in a first direction, and a second cam means on said kicker member responsive to movement of the latter to its second position to guide the second sheet in a second direction different from said first direction so as to separate said two sheets.

9. An apparatus for automatically producing photocopies, said apparatus comprising sheet opening means for receiving a stack of three superimposed sheets in contacting relation, said sheets including a negative sheet, a positive sheet and an original document sheet to be copied, means responsive to the thrust of at least one of said sheets for automatically separating said positive sheet from said stack, means for conveying said negative sheet and said document sheet in superimposed contacting relation, means for exposing said document sheet and said negative sheet while the sheets are being conveyed in superimposed contacting relation, whereby to produce a latent photographic image in said negative sheet, means for automatically separating said negative sheet from said document sheet after said exposure, means for conveying said separated document sheet outwardly of the apparatus, a developing tank adapted to contain developer solution, means for conveying said negative and positive sheets through said developing tank, means for conveying said positive sheet along a path equal in length to that of said negative sheet whereby said negative sheet and positive sheet enter said tank simultaneously and emerge therefrom in substantial alignment, and pressure means for then pressing said negative and positive sheets into face-to-face contact.

10. An apparatus as recited in claim 9 wherein said means for separating said negative and document sheets comprises a kicker member, means rotatably mounting said kicker member for oscillatory movement between two alternate angular positions, said kicker member having recess means for engageably receiving the leading edge of a first of said sheets during advancing movement of the latter and while the kicker member is in a first of said positions to cause the kicker member to pivot from said first position to said second position thereof in response to the thrust of said first sheet, a first guide means on said kicker member for guiding said first sheet in a first direction, and a second guide means on said kicker member responsive to movement of said kicker member to said second position to guide the second sheet in a second direction so as to separate said sheets from each other.

11. An apparatus for automatically producing photocopies, said apparatus comprising sheet inlet means for receiving a stack of three superimposed sheets in contacting relation, said sheets including a negative sheet, a positive sheet and a document sheet to be copied, moveable means actuatable in response to the thrust of one of said sheets for separating said positive sheet from said stack, means for maintaining said negative sheet and said document sheet in superimposed contacting relation, means for exposing said document sheet and said negative sheet while the sheets are being maintained in said superimposed contacting relation so as to produce a latent photographic image in said negative sheet, means for separating said document sheet from said exposed negative sheet, means for conveying said separated document sheet outwardly of the apparatus, a developing tank adapted to contain developer solution, means for conveying said exposed separated negative sheet and said positive sheet through said developing tank, means for conveying said positive sheet after being separated from said other sheets along a path equal in length to that of said negative sheet whereby said negative and positive sheets enter said developer solution simultaneously and emerge therefrom in substantial alignment, and pressure roller means for pressing said negative and positive sheets together upon emergence thereof from said developing tank.

12. An apparatus as recited in claim 11 wherein said movable means for separating said positive sheet comprises a kicker member, means mounting said kicker member for movement to either one of two alternate positions, means on said kicker member responsive to engagement by one of said sheets to move said kicker member from a first of said positions to the second position thereof, a first cam means on said kicker member for guiding said one sheet in a first direction, and a second cam means on said kicker member responsive to movement of the latter to its second position to guide a second sheet in a second direction different from said first direction so as to separate said sheets.

13. An apparatus for automatically producing photocopies, said apparatus comprising an exposure means, a developing tank, sheet inlet means for receiving a stack of three sheets in superimposed contacting relation, said sheets consisting of a document sheet to be copied, a positive sheet and a negative sheet, means responsive to the thrust of at least one of said sheets for automatically separating said positive sheet from said other two sheets, pressure means, guide means forming a first sheet travel path extending from said inlet means to said pressure means, additional guide means forming a second sheet travel path extending from said inlet means past said exposure means and then to said pressure means, at least one of said paths extending through said developing tank, means for impelling said positive sheet along said first path, means for impelling said document sheet and negative sheet along said second path, sheet separator means located adjacent said second path for separating said document sheet from said exposed negative sheet, other guide means forming a third sheet travel path extending from said sheet separator means outwardly of the apparatus, and means for impelling said separated document sheet along said third path and outwardly of the apparatus, the respective lengths of said first and second paths between said sheet inlet means and said pressure means being approximately equal.

14. An apparatus as recited in claim 13 wherein said means for seperating said negative and document sheets comprises a kicker member, means rotatably mounting said kicker member for oscillatory movement between two alternate angular positions, said kicker member having recess means for engageably receiving the leading edge of a first of said sheets during advancing movement of the latter and while the kicker member is in a first of said positions to cause the kicker member to pivot from said first position to said second position thereof in response to the thrust of said first sheet, a first guide means on said kicker member for guiding said first sheet in a first direction, and a second guide means on said kicker member responsive to movement of said kicker member to said second position to guide the second sheet in a second direction so as to separate said sheets from each other.

References Cited in the file of this patent
UNITED STATES PATENTS

| | | |
|---|---|---|
| 2,431,520 | Streich | Nov. 25, 1947 |
| 2,559,159 | Hurby | July 3, 1951 |
| 2,664,801 | Eisbein | Jan. 5, 1954 |
| 2,732,778 | Limberger | Jan. 31, 1956 |
| 2,804,304 | Taini | Aug. 27, 1957 |
| 2,903,954 | Schwienbacher | Sept. 15, 1959 |